Patented Apr. 4, 1950

2,502,996

UNITED STATES PATENT OFFICE 2,502,996

FERTILIZERS AND METHODS FOR THEIR PRODUCTION

Leonard V. Rohner, deceased, late of Syracuse, N. Y., by Cynthia Ann Rohner, executrix, Syracuse, N. Y., and Alvin P. Wood, Syracuse, N. Y., assignors to Allied Chemical & Dye Corporation, a corporation of New York No Drawing. Application June 20, 1944, Serial No. 541,296

6 Claims. (Cl. 71—30)

This invention relates to fertilizers containing deliquescent fertilizer compounds, i. e. compounds containing at least one of the fertilizing elements phosphorus, nitrogen and potassium, and a urea-formaldehyde resin which contains water-insoluble nitrogen of high agronomic activity. The fertilizers of this invention have a decreased tendency to cake or to become moist through absorption of water from the atmosphere as compared with the deliquescent compounds themselves.

In our copending application for United States Patent No. 2,415,705, granted February 11, 1947, of which the present application is a continuation-in-part, we have described processes whereby urea-formaldehyde resins particularly valuable for use as a fertilizer are produced. These resins are characterized by containing nitrogen which is water-insoluble as determined by the method described on page 29, paragraphs 34 and 35, of "Official and Tentative Methods of Analysis," 1940 edition, of the Association of Official Agricultural Chemists, known as the A. O. A. C., and this insoluble nitrogen has an activity at least 80% as determined by the neutral $KMnO_4$ test set forth on page 29, paragraphs 36 and 37, of the 1940 edition of "Official and Tentative Methods of Analysis" of the A. O. A. C. This insoluble, active nitrogen is agronomically available; i. e., is available for plant growth when the resin is used as a fertilizer.

As described in our above copending application, an urea-formaldehyde resin having these desirable characteristics is produced by reacting urea and formaldehyde in an acidic aqueous solution from which the insoluble resin precipitates and maintaining the solution during the precipitation of the resin under correlated conditions of acidity and temperature. At temperatures of 40° to 75° C. the acidity of the solution is maintained at a pH of 3 to 5 and at temperatures of 75° to 90° C. the acidity of the solution is maintained at a pH below 6 and above 4. The solution is preferably maintained at an acidity of pH 3 to 5 and at temperatures of 40° to 75° C. during the precipitation of the resin and the formaldehyde and urea are employed in the ratio of 0.75 to 1.25 mols formaldehyde to 1 mol urea. The resin may be separated from the solution and dried, preferably at temperatures below 75° C. particularly when there is acidic material present in the resin being dried. With no acid, such as acidic mother liquor present, the resin may be dried at temperatures up to 100° C. or even higher, although it should not be exposed too long to high temperatures, otherwise there may be a decrease in the activity of the nitrogen.

We have further discovered that resins produced in the above-described manner, when mixed with deliquescent fertilizer compounds greatly improve the physical character of the mixture as compared with the deliquescent compound itself with respect to caking or becoming damp by absorption of moisture from the atmosphere. This is true even though the mixture contains only a small proportion of the resin. Mixtures of the resin and a deliquescent compound such as ammonium nitrate appear to behave similarly to ammonium nitrate alone with respect to absorbing moisture from the atmosphere, in that the relative humidity and temperatures of atmospheres from which the mixture and the salt itself take up moisture are about the same and the rate of absorbing moisture is about proportionate to the amount of ammonium nitrate present whether as the salt alone or as the salt mixed with the resin. However, we have discovered that these resins impart to the mixture the ability to absorb much more moisture without the mixture becoming damp. The mixtures show a much lessened tendency to cake when moisture is alternately absorbed and given off by contact with atmospheres of relatively high and low humidity, and any caking that does result produces agglomerates which are more readily crushed than in the case of ammonium nitrate itself not mixed with the resin.

This effect of the resin is not merely that of any inert material mixed with the deliquescent material. A mixture of ammonium nitrate and the resin can absorb far more moisture without becoming damp than a mixture of ammonium nitrate and dolomite, for example. Granules of ammonium nitrate coated with a quantity of resin corresponding to about 25% of the weight of the ammonium nitrate granules themselves showed no caking even after alternately absorbing moisture from the atmosphere and drying out with a moisture change as much as 2% between the material with absorbed moisture and after drying out, whereas granules of ammonium nitrate coated with the same amount of finely divided dolomite formed hard cakes with a total moisture change of only about 0.5%.

Our invention, therefore, comprises fertilizers containing a deliquescent fertilizer compound mixed with the above-described resin. The resin is preferably in the form of relatively small particles intermingled with or coated on particles of the deliquescent compound. The preferred compositions of our invention involve mixtures of a major proportion of the deliquescent compound and a minor proportion of the resin, preferably about 5 to 30 parts by weight of the resin to 95 to 70 parts by weight of deliquescent compound, since these amounts of resin effectively decrease the caking of the deliquescent materials. However, our invention is not limited to these proportions of materials, since the amount of resin required to give a mixture of improved character with respect to caking varies according to the particular deliquescent compound or compounds in the mixture. In many cases proportions of materials outside the stated preferred range are effective to give marketable products with materially lessened tendencies to cake. It is also preferred that the deliquescent fertilizer compound be in the form of granules with finely divided resin coated thereon. Our preferred fertilizer is ammonium nitrate granules coated with about 5% to 25% of the resin which, before being coated onto the granules, has a particle size of about 200 mesh.

Since the caking of fertilizer materials, which it is an object of this invention to avoid, is related to the property of the materials to absorb water from the atmosphere and become moist with solution of the solid material in the absorbed water, our invention is applicable to deliquescent fertilizer compounds in general, particularly those which are relatively soluble in water; i. e., which at a temperature of 40° to 50° C. form solutions containing at least 10% of the fertilizer compound. Thus, the procedures herein described for the treatment of ammonium nitrate may be used for the treatment of such compounds as potassium chloride or sulfate or nitrate, ammonium sulfate, sodium nitrate and urea, and mixtures of any of these materials with each other or with other materials, for example mixtures of ammonium nitrate and urea. Our invention includes, therefore, mixing the above-described resins with any of these materials and the resulting mixtures.

The following examples are representative of methods for producing the product of this invention and of the product itself:

*Example 1.*—About 3000 parts of solid urea are added to about 4000 parts of a 37½% solution of formaldehyde in water and dissolved in the solution. This is equivalent to about an equal mol ratio of formaldehyde and urea. There is also added about 2500 parts of water. These materials at room temperature are mixed together. As the urea dissolves, the solution is somewhat cooled by the negative heat of solution of the urea. Ammonium nitrate is then added to the solution to bring it to an acidity of 4.5 to 5. The solution is allowed to stand for some time, during which period there is a slow rise in temperature. After an induction period solid resin begins to precipitate from the solution, the temperature of the reaction mixture rises and the acidity slowly rises to a pH of about 3 as the resin precipitates. The reaction mixture is allowed to stand until completion of the resin precipitation without allowing the temperature to rise above 65° C. If the temperature tends to rise above this point, the temperature rise may be controlled by indirectly cooling the reaction mixture, by adding cold water thereto or by any other suitable means.

After completion of the formation and precipitation of the urea-formaldehyde resin the solid is filtered from the mother liquor and washed with water to remove adhering, acidic mother liquor. The washed solid is then dried by treatment with dry air at room temperature. Resins thus produced contained 32% to 36% total nitrogen and about 29% to 35% insoluble nitrogen having an activity of at least 80% by the neutral $KMnO_4$ test.

The resin thus produced is comminuted, if necessary, and screened to pass a 200 mesh screen. About 60 parts by weight of pebbled or grained ammonium nitrate are wetted with 6% of their weight of water and the wetted material is mixed with about 40 parts by weight of the above finely divided resin in a rotary drum mixer. Resin is coated onto the granules by tumbling the mixture for a few minutes at room temperature. The temperature of the ammonium nitrate is then raised to about 70°–80° C. and air passed therethrough to dry the material until it loses all appearance of being moist or damp. The thus treated material is screened to remove resin not adhering to the ammonium nitrate granules. This screening may be done on a shaker-type screen which removes resin not fairly tightly bound to the granules.

A granular ammonium nitrate coated with resin in this manner gave a product containing about 22% (based on the total weight of the product) of the resin retained as coating on the ammonium nitrate granules. The material thus coated remained physically dry even when it had absorbed moisture from the atmosphere in amounts up to as high as 6% to 7% moisture in the material and does not cake even when it alternately absorbs and gives up moisture to the extent of about 2% water.

Instead of coating the ammonium nitrate granules in the manner described above, the following procedure may be employed:

The ammonium nitrate granules warmed up to about 70°–80° C. may be moistened with water in amount just short of that which causes them to become sticky at this elevated temperature and then agitated with a small amount of the resin in a rotary mixer. The resin becomes coated onto the granules and they simultaneously dry at the elevated temperature. The granules are then again moistened with water and again tumbled with a small amount of resin. By alternate moistening of the granules with water and addition and coating thereon of resin in several applications, during which a total of 15 parts of the resin were mixed with 85 parts of the ammonium nitrate granules, a product was obtained which, after screening out nonadhering resin, contained about 10% resin coated onto the granules. A total of 6% water based on the weight of the ammonium nitrate granules was used in coating them with the resin.

The above procedures for coating a granular deliquescent fertilizer material with resin are given merely as representative methods for applying the desired coat to the granules using a binder such as water to aid in obtaining adherence of the finely divided resin to the granules without the water or other binder being present at any time in amount sufficient to destroy the granular character of the material under the conditions of operation such as temperature, method of agitating the granules with the resin, etc. Nor is it necessary for the resin to be coated onto granules of the deliquescent material for it to give a product of improved physical characteristics when stored under conditions such that water may be absorbed from the atmosphere.

As pointed out above, this improvement in the product is obtainable by intimately mixing the resin with the deliquescent material. Further, it is not necessary to employ either in treating ammonium nitrate or another deliquescent fertilizer the particular proportions of resin to deliquescent material used in the processes of the above example. The proportion of resin mixed with or coated onto the deliquescent material may vary widely and the resin present still have its characteristic effect of improving its physical character. Nevertheless, the preferred ranges in proportion of resin to deliquescent fertilizer compound from the viewpoint of cost of the fertilizer, its insoluble nitrogen content and best storage characteristics, are from about 5 to 30 parts of resin for every 95 to 70 parts of deliquescent compound.

We have particularly described and illustrated the preparation of products by mixing a finely divided resin with a solid fertilizer compound. The products of this invention need not contain the resin in finely divided condition as illustrated above, but may contain the resin more or less as a continuous phase dispersed throughout a mass of the deliquescent compound.

The following example will illustrate another method of preparing the fertilizer products of this invention:

*Example 2.*—The method of reacting urea and formaldehyde to form a resin of Example 1 above, is modified in the following manner to produce a mixture of the desired resin and an ammonium salt, such as ammonium nitrate.

The solution containing urea and formaldehyde is acidified to a pH of 4.5 to 5 by addition of an acid or an ammonium salt, e. g. ammonium nitrate. During the initial induction period the formaldehyde reacts with the urea. After the formaldehyde has undergone this preliminary reaction, which precedes formation of the insoluble resin, any desired quantity of ammonium nitrate or other ammonium salt is dissolved in the solution. For example, the total amount of ammonium nitrate added to the reaction mixture may be equal to the weight of the urea incorporated therein. After precipitation of the urea-formaldehyde resin the resulting slurry of solid and mother liquor is then evaporated to dryness at temperatures preferably not higher than 75° C. The mixture of solid ammonium salt and resin thus obtained may be broken up to desired sized particles. The fertilizer thus made contains both water-soluble nitrogen and insoluble nitrogen, the latter having a high activity by the neutral $KMnO_4$ test and being agronomically available.

In this modification of the process of Example 1, by adding to the reaction mixture the desired large quantities of ammonium nitrate or other ammonium salt such as ammonium sulfate or an ammonium phosphate only after the formaldehyde has reacted with the urea, the acidity of the reaction mixture is maintained at the desired pH 3 to 5 during the precipitation of the urea-formaldehyde resin. If too much ammonium salt is initially added before the formaldehyde has reacted with the urea, a reaction occurs between the salt and formaldehyde forming hexamethylene tetramine and liberating free acid in amount sufficient to render the reaction mixture from which the resin is precipitated unduly acid.

A procedure of this type may also be used to prepare a mixture of urea and resin. In this case the solution of urea and formaldehyde is prepared containing these materials in a suitable ratio for the formation of the desired resin, e. g. in a mol ratio of formaldehyde to urea no smaller than 0.75 to 1, and preferably 0.75 to 1.25 mols of formaldehyde to 1 mol urea. This solution is acidified and maintained at a pH of 3 to 5 and at temperatures of 40° to 75° C., or at a pH above 4 and below 6 and at temperatures of 75° to 90° C. until completion of the reaction of the urea and formaldehyde to precipitate the insoluble resin. After the resin has been formed and precipitated urea, preferably as solid, is added to the slurry of resin and liquid and intimately incorporated therewith. The urea may in whole or in part dissolve in the slurry. The slurry is then evaporated to dryness at temperatures preferably no higher than 75° C. and the mixture of urea and resin thus obtained may be broken up into particles of desired size. A fertilizer containing both urea and ammonium nitrate may be prepared by modifying this last described procedure by adding ammonium nitrate to the acidified urea-formaldehyde solution after the formaldehyde has substantially completely reacted with the urea and either before precipitation of the insoluble resin, as described above in Example 2, or after precipitation of the resin. The desired quantity of urea is added after precipitation of the resin, and the water is evaporated to form a solid fertilizer product.

In mixtures containing two or more deliquescent fertilizer compounds the ratios of resin to deliquescent compound heretofore given and as set forth in the claims correspond to ratios of resin to the total amount of deliquescent fertilizer compounds present in the mixture. For example, whether the mixture contains ammonium nitrate or urea or both, it is preferred to employ about 5 to 30 parts by weight of the resin to 95 to 70 parts by weight of total ammonium nitrate and urea present in the mixture.

We claim:

1. As a new composition of matter granules of ammonium nitrate coated with a urea-formaldehyde resin prepared by reacting formaldehyde and urea in an acidic aqueous solution in proportions forming an insoluble resin which precipitates to form a mixture of mother liquor and resin and maintaining said solution during the precipitation of said resin at temperatures in the range of 40° to 90° C. and under conditions of acidity so correlated with the temperature of the solution that when the solution is at temperatures of 40° to 75° C. the acidity of said solution is maintained at a pH of 3 to 5, and when the solution is at temperatures of 75° to 90° C. the acidity of said solution is maintained at a pH below 6 and above 4.

2. As a new composition of matter granules of ammonium nitrate coated with about 5 to 25% of a finely divide urea-formaldehyde resin prepared by reacting formaldehyde and urea in the ratio of 0.75 to 1.25 mols formaldehyde to 1 mol urea in an acidic aqueous solution at temperatures of 40° to 75° C. to form a mixture of mother liquor and resin precipitated from said solution and maintaining the solution during the precipitation of said resin at a pH of 3 to 5.

3. The process for the production of a fertilizer which comprises reacting formaldehyde and urea in the ratio of 0.75 to 1.25 mols formaldehyde to 1 mol urea in an acidic aqueous solution at temperatures of 40° to 75° C. to form a mixture of mother liquor and resin precipitated from said solution, maintaining the solution during the precipitation of said resin at a pH of 3 to 5, and coating onto granules of ammonium nitrate 5 to 25 parts by weight of said resin in finely divided form for every 95 to 75 parts by weight of said granular ammonium nitrate.

4. The process for the production of a fertilizer which comprises reacting formaldehyde and urea in the proportions of 0.75 to 1.25 mols formaldehyde for every one mol of urea in an acidic aqueous solution maintained at a pH of 3 to 5 and at temperatures of 40° to 75° C. during precipitation from the solution of the insoluble resin formed from the formaldehyde and urea, adding to said solution after substantially all the formaldehyde present therein has combined with the urea a deliquescent ammonium salt, and thereafter evaporating the water from said solution at temperatures below 75° C. to form a solid containing said resin and ammonum salt, said ammonium salt being added to said solution in amounts such that the solid obtained after evaporation of the water contains not less than about 50% of said ammonium salt and a quantity of said resin sufficient to be effective to substantially increase the amount of absorbed moisture which causes said solid to become damp and form hard cakes as compared with the amount of absorbed moisture which causes said ammonium salt in the absence of said resin to become damp and form hard cakes.

5. The process for the production of a fertilizer which comprises acidifying an aqueous solution of formaldehyde and urea with ammonium nitrate in amount sufficient to maintain said solution at a pH of 3 to 5 until substantially all the formaldehyde has reacted with the urea, said solution containing 0.75 to 1.25 mols formaldehyde for every one mol of urea, thereafter adding additional ammonium nitrate to the solution, maintaining said solution at temperatures of 40° to 75° C. during precipitation therefrom of the insoluble resin formed by reaction of the formaldehyde and urea, and thereafter evaporating the water from said solution at temperatures below 75° C. to form a solid containing said resin and ammonium nitrate, said ammonium nitrate being added to said solution in amount such that the solid obtained after evaporation of the water contains not less than about 50% of said ammonium nitrate and a quantity of said resin sufficient to be effective to substantially increase the amount of absorbed moisture which causes said solid to become damp and form hard cakes as compared with the amount of absorbed moisture which causes said ammonium nitrate in the absence of said resin to become damp and form hard cakes.

6. The process for the production of fertilizer which comprises acidifying an aqueous solution of formaldehyde and urea containing 0.75 to 1.25 mols formaldehyde for every 1 mol urea and maintaining said solution at a pH of 3 to 5 and at temperatures of 40° to 75° C. until reaction of the formaldehyde and urea forming an insoluble resin and precipitation of this resin is substantially completed, and thereafter adding urea to the resulting slurry of resin and mother liquor and evaporating the water from the slurry containing urea at temperatures below 75° C. to form a solid containing said resin and urea, said urea being added to said solution in amount such that the solid obtained after evaporation of the water contains not less than about 50% of said urea and a quantity of said resin sufficient to be effective to substantially increase the amount of absorbed moisture which causes said solid to become damp and form hard cakes as compared with the amount of absorbed moisture which causes said urea in the absence of said resin to become damp and form hard cakes.

CYNTHIA ANN ROHNER,
*Executrix of the Last Will and Testament of Leonard V. Rohner, Deceased.*
ALVIN P. WOOD.

REFERENCES CITED

The following references are of record in the file of this patent:

UNITED STATES PATENTS

| Number | Name | Date |
| --- | --- | --- |
| 1,967,261 | Ripper | July 24, 1934 |
| 2,056,455 | Howald | Oct. 6, 1936 |
| 2,140,561 | Smidth | Dec. 20, 1938 |
| 2,255,027 | Keenen | Sept. 2, 1941 |
| 2,415,705 | Rohner et al. | Feb. 11, 1947 |

FOREIGN PATENTS

| Number | Country | Date |
| --- | --- | --- |
| 419,422 | Canada | Apr. 4, 1944 |
| 431,585 | Germany | July 12, 1926 |

OTHER REFERENCES

Tsuruta: J. Soc. Chem. Ind., Japan, vol. 43, No. 11, pages 366B, 369B (Nov. 1940).

Ellis: Chemistry of Synthetic Resins, vol. I, pages 594–596 (1935).